(12) United States Patent
Olivier et al.

(10) Patent No.: US 8,959,902 B2
(45) Date of Patent: Feb. 24, 2015

(54) EXHAUST TREATMENT BURNER AND MIXER SYSTEM

(71) Applicant: Tenneco Automotive Operating Company Inc., Lake Forest, IL (US)

(72) Inventors: Keith G. Olivier, Jackson, MI (US); Nicholas Morley, Pinckney, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 12 days.

(21) Appl. No.: 13/778,737

(22) Filed: Feb. 27, 2013

(65) Prior Publication Data

US 2014/0238002 A1 Aug. 28, 2014

(51) Int. Cl.
- *F01N 3/00* (2006.01)
- *F01N 3/02* (2006.01)
- *F01N 3/10* (2006.01)
- *F01N 3/023* (2006.01)

(52) U.S. Cl.
CPC ..................................... *F01N 3/0234* (2013.01)
USPC ................... 60/303; 60/295; 60/297; 60/300; 60/311

(58) Field of Classification Search
USPC ..................... 60/286, 295, 297, 300, 303, 311
See application file for complete search history.

(56) References Cited

U.S. PATENT DOCUMENTS

| | | | |
|---|---|---|---|
| 1,848,990 A * | 3/1932 | Boyd et al. | 422/174 |
| 2,127,977 A | 8/1938 | Lamb | |
| 2,621,477 A | 12/1952 | Powter et al. | |
| 2,628,475 A | 2/1953 | Heath | |
| 2,797,745 A | 7/1957 | Rowell | |
| 3,136,353 A | 6/1964 | Lloyd | |
| 3,174,526 A | 3/1965 | Von Linde | |
| 4,255,122 A | 3/1981 | Alpkvist et al. | |
| 4,364,724 A | 12/1982 | Alpkvist | |
| 4,364,725 A | 12/1982 | Buschulte | |
| 4,408,983 A | 10/1983 | Masters et al. | |
| 4,465,046 A | 8/1984 | May | |
| 4,588,372 A | 5/1986 | Torborg | |
| 4,657,504 A | 4/1987 | Akiyama et al. | |

(Continued)

FOREIGN PATENT DOCUMENTS

| JP | H0548410 B2 | 7/1993 |
|---|---|---|
| KR | 20130012734 A | 2/2013 |

OTHER PUBLICATIONS

Tenneco/Woodward Publication entitled T.R.U.E.-Clean Max, 4 pages, dated Aug. 2012.

(Continued)

*Primary Examiner* — Audrey K Bradley
(74) *Attorney, Agent, or Firm* — Harness, Dickey & Pierce, P.L.C.

(57) ABSTRACT

An exhaust aftertreatment system may include a first housing and a burner. The first housing may include first and second chambers. The first chamber may include an exhaust gas inlet receiving exhaust gas from an engine. The second chamber may receive exhaust gas from the first chamber and may include an exhaust gas outlet. The burner may include a second housing and a combustion chamber disposed within the second housing. The second housing may be at least partially disposed within the first chamber. The burner may supply heated gas to the second chamber. The heated gas within the burner may be fluidly isolated from exhaust gas in the first chamber. The second housing may be in a heat transfer relationship with exhaust gas in the first chamber.

22 Claims, 11 Drawing Sheets

(56) References Cited

U.S. PATENT DOCUMENTS

| | | | |
|---|---|---|---|
| 4,684,341 | A | 8/1987 | Kawamura et al. |
| 4,825,658 | A | 5/1989 | Beebe |
| 4,951,464 | A * | 8/1990 | Eickhoff et al. ............. 60/274 |
| 5,090,896 | A | 2/1992 | Kenner et al. |
| 5,140,814 | A * | 8/1992 | Kreutmair et al. ............ 60/303 |
| 5,320,523 | A * | 6/1994 | Stark ........................ 431/353 |
| 5,417,059 | A | 5/1995 | Hartel et al. |
| 5,437,123 | A | 8/1995 | Greiner et al. |
| 5,546,701 | A | 8/1996 | Greiner et al. |
| 5,571,484 | A | 11/1996 | Pettit et al. |
| 5,590,526 | A | 1/1997 | Cho |
| 5,617,721 | A | 4/1997 | Slawson |
| 5,826,428 | A | 10/1998 | Blaschke |
| 5,829,248 | A | 11/1998 | Clifton |
| 5,944,510 | A | 8/1999 | Greiner et al. |
| 6,540,151 | B1 | 4/2003 | Steiner et al. |
| 6,916,172 | B2 | 7/2005 | Steiner |
| 7,748,976 | B2 | 7/2010 | Burrahm et al. |
| 7,762,060 | B2 | 7/2010 | Easley, Jr. et al. |
| 8,821,154 | B2 | 9/2014 | Yamashita et al. |
| 2005/0048430 | A1 | 3/2005 | Steiner |
| 2006/0101811 | A1 | 5/2006 | Linna et al. |
| 2006/0162690 | A1 * | 7/2006 | Kim ........................... 123/306 |
| 2006/0283181 | A1 * | 12/2006 | Crawley et al. ............. 60/303 |
| 2007/0169469 | A1 | 7/2007 | Knitt |
| 2007/0245718 | A1 | 10/2007 | Cheng et al. |
| 2008/0092532 | A1 | 4/2008 | Bareis et al. |
| 2008/0307780 | A1 | 12/2008 | Iverson et al. |
| 2009/0180937 | A1 * | 7/2009 | Nohl et al. ................ 422/176 |
| 2009/0255242 | A1 | 10/2009 | Paterson et al. |
| 2010/0083925 | A1 | 4/2010 | Winter et al. |
| 2011/0023457 | A1 | 2/2011 | Miebach et al. |
| 2011/0146264 | A1 | 6/2011 | Roychoudhury et al. |
| 2011/0197570 | A1 * | 8/2011 | Kalantarifiroozabad et al. ........................ 60/303 |
| 2011/0289906 | A1 | 12/2011 | Morley et al. |
| 2012/0036847 | A1 | 2/2012 | Schreiber et al. |
| 2012/0124982 | A1 * | 5/2012 | Bell et al. ................... 60/324 |
| 2012/0167569 | A1 | 7/2012 | Takiguchi et al. |
| 2012/0192547 | A1 | 8/2012 | Mastbergen et al. |
| 2014/0238000 | A1 | 8/2014 | Olivier |
| 2014/0238002 | A1 | 8/2014 | Olivier et al. |
| 2014/0245718 | A1 | 9/2014 | Olivier |

OTHER PUBLICATIONS

Tenneco/Woodward Publication entitled T.R.U.E.-Clean Mini, 4 pages, dated Oct. 2012.

* cited by examiner

EXHAUST TREATMENT BURNER AND MIXER SYSTEM

FIELD

The present disclosure relates to a system for treating exhaust gases. More particularly, an exhaust aftertreatment burner and mixer system is discussed.

BACKGROUND

This section provides background information related to the present disclosure and is not necessarily prior art.

In an attempt to reduce the quantity of $NO_X$ and particulate matter emitted to the atmosphere during internal combustion engine operation, a number of exhaust aftertreatment devices have been developed. A need for exhaust aftertreatment systems particularly arises when diesel combustion processes are implemented. Typical aftertreatment systems for diesel engine exhaust may include one or more of a diesel particulate filter (DPF), a selective catalytic reduction (SCR) system, a hydrocarbon (HC) injector, and a diesel oxidation catalyst (DOC).

During engine operation, the DPF traps soot emitted by the engine and reduces the emission of particulate matter (PM). Over time, the DPF becomes loaded and begins to clog. Periodic regeneration or oxidation of the trapped soot in the DPF is required for proper operation. To regenerate the DPF, relatively high exhaust temperatures in combination with an ample amount of oxygen in the exhaust stream are needed to oxidize the soot trapped in the filter.

The DOC is typically used to generate heat to regenerate the soot loaded DPF. When hydrocarbons (HC) are sprayed over the DOC at or above a specific light-off temperature, the HC will oxidize. This reaction is highly exothermic and the exhaust gases are heated during light-off. The heated exhaust gases are used to regenerate the DPF.

Under many engine operating conditions, however, the exhaust gas is not hot enough to achieve a DOC light-off temperature of approximately 300° C. As such, DPF regeneration does not passively occur. Furthermore, $NO_X$ adsorbers and selective catalytic reduction systems typically require a minimum exhaust temperature to properly operate. Therefore, a burner may be provided to heat the exhaust stream upstream of the various aftertreatment devices to a suitable temperature to facilitate regeneration and efficient operation of the aftertreatment devices. While burners have been associated with exhaust treatment systems in the past, it may be beneficial to provide an improved burner and mixer system to provide improved ignition at very low temperatures, improved heat transfer between the exhaust gas and the burner, improved fuel efficiency and/or energy usage, and robust longevity.

SUMMARY

This section provides a general summary of the disclosure, and is not a comprehensive disclosure of its full scope or all of its features.

In one form, the present disclosure provides an exhaust aftertreatment system that may include a first housing and a burner. The first housing may include first and second chambers. The first chamber may include an exhaust gas inlet receiving exhaust gas from an engine. The second chamber may receive exhaust gas from the first chamber and may include an exhaust gas outlet. The burner may include a second housing and a combustion chamber disposed within the second housing. The second housing may be at least partially disposed within the first chamber. The burner may supply heated gas to the second chamber. The heated gas within the burner may be fluidly isolated from exhaust gas in the first chamber. The second housing may be in a heat transfer relationship with exhaust gas in the first chamber.

In another form, the present disclosure provides an exhaust aftertreatment system that may include a first housing, a first diffuser and a burner. The first housing may include a tubular body defining first and second chambers. The first chamber may include an inlet receiving exhaust gas from an engine. The second chamber may be in fluid communication with the first chamber and may include an outlet discharging the exhaust gas upstream of an aftertreatment device. The first diffuser may be disposed within the tubular body and may define an outlet of the first chamber and an inlet of the second chamber. The burner may include a second housing and a combustion chamber disposed within the second housing. The second housing may be at least partially disposed within the first chamber. The burner may supply heated gas to the second chamber. The second housing may be in a heat transfer relationship with exhaust gas in the first chamber.

In yet another form, the present disclosure provides an exhaust aftertreatment system that may include first and second tubular bodies and a burner. The first tubular body may include a first longitudinal axis and defining a chamber receiving exhaust gas from an engine and discharging the exhaust gas upstream of an aftertreatment device. The second tubular body may extend outward from the first tubular body and may define an inlet to the chamber. The second tubular body may include a second longitudinal axis that is angled relative to the first longitudinal axis and is non-intersecting with the first longitudinal axis. The burner may include a housing and a combustion chamber disposed within the housing. The housing may be at least partially disposed within the chamber. The burner may supply heated gas to the first tubular body. The housing may be in a heat transfer relationship with exhaust gas in the chamber.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
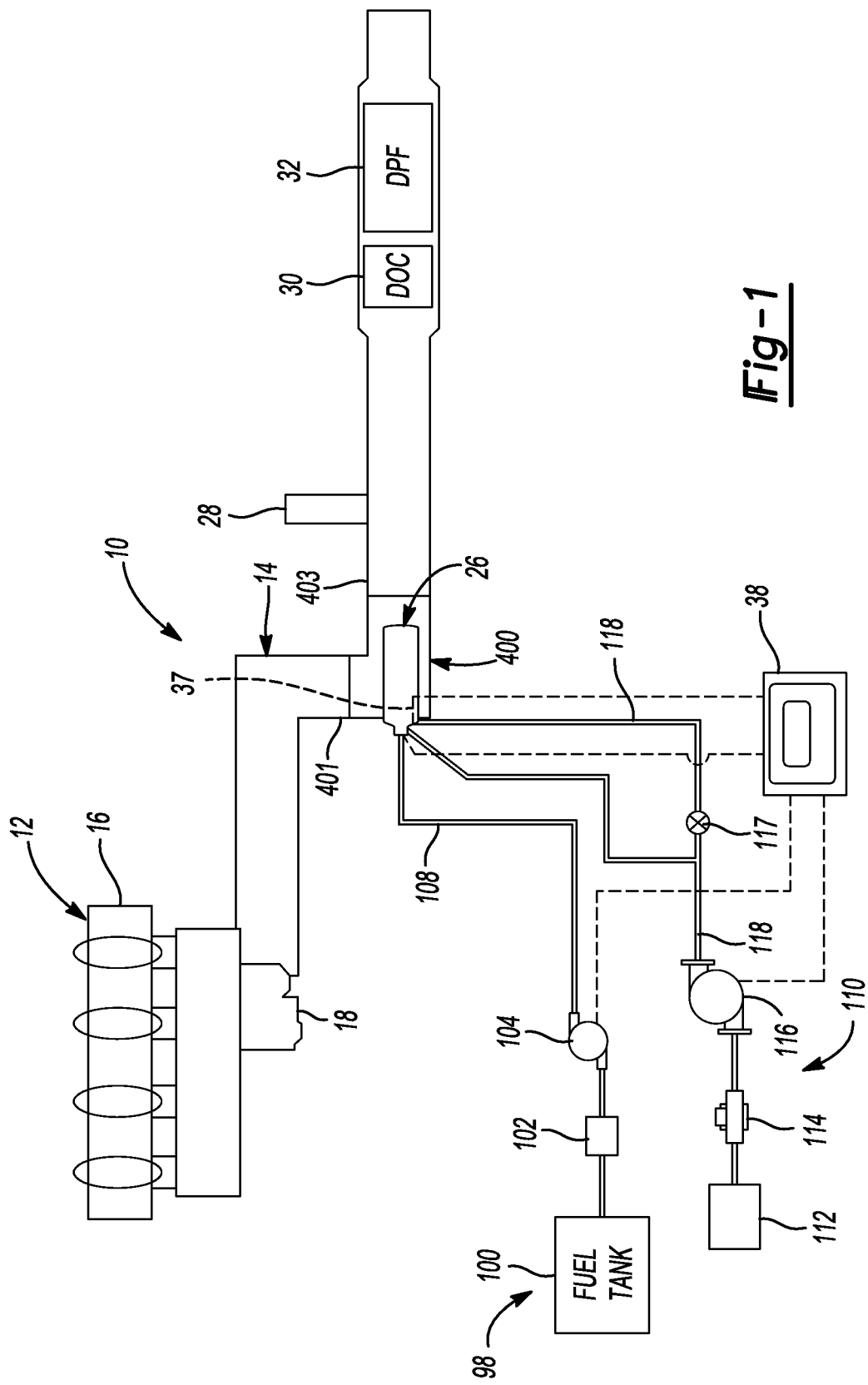
FIG. 1 is a schematic representation of an engine and exhaust aftertreatment system according to the principles of the present disclosure.
Figure 2:
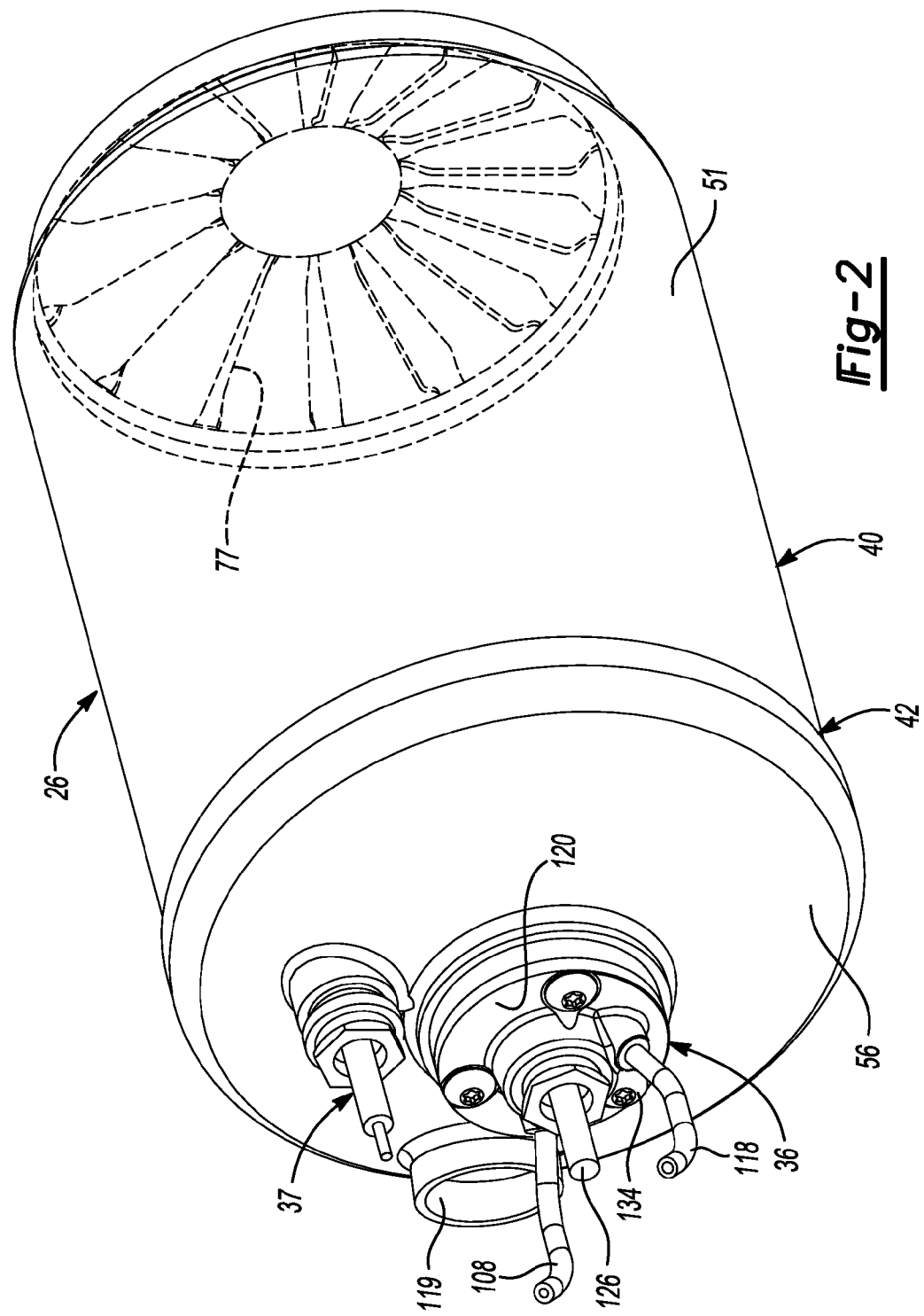
FIG. 2 is a perspective view of a burner of the exhaust aftertreatment system of FIG. 1.
Figure 3:
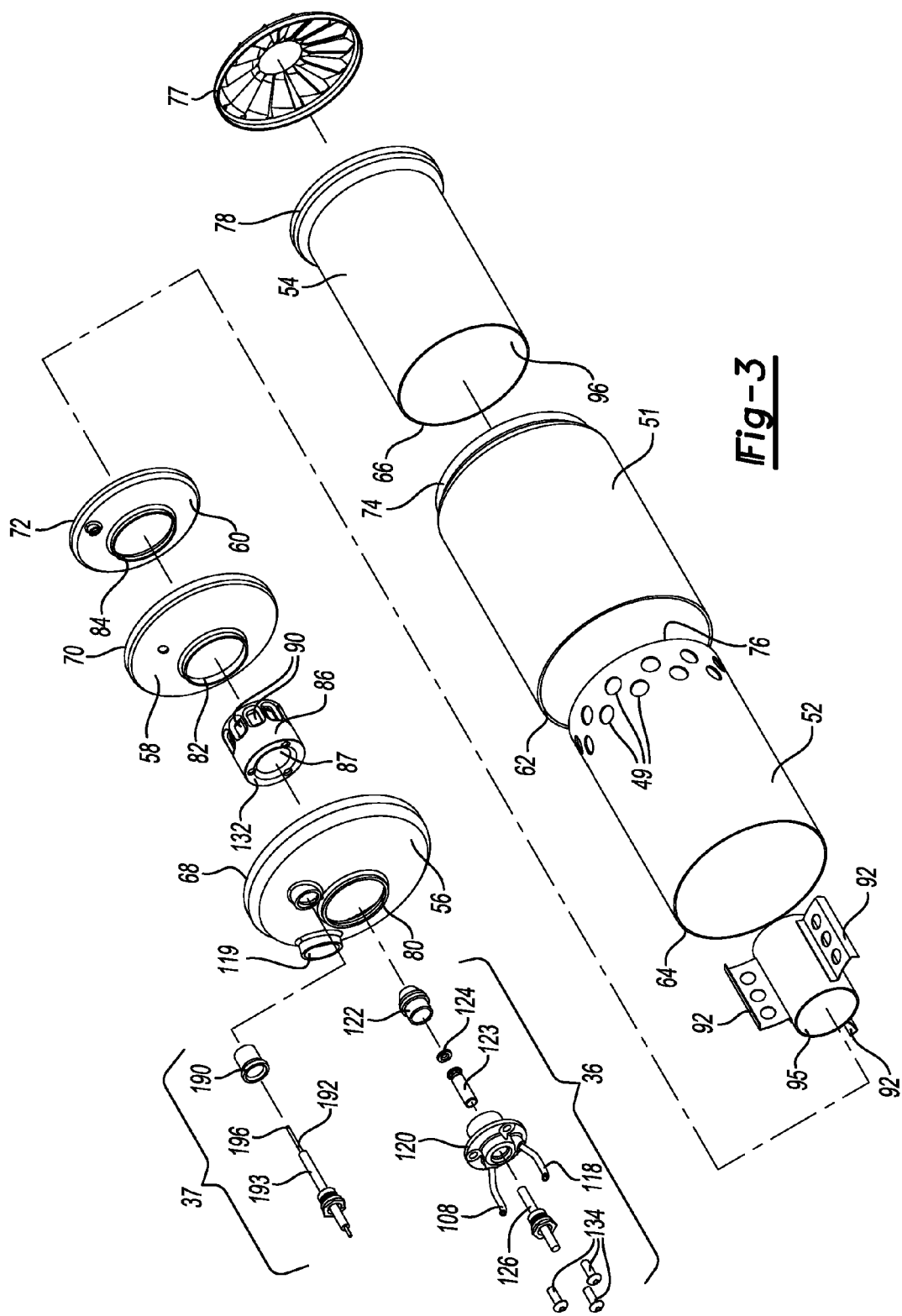
FIG. 3 is an exploded perspective view of the burner.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 depicts an exhaust gas aftertreatment system 10 for treating the exhaust output from an exemplary engine 12 to a main exhaust passageway 14. An intake passage 16 is coupled to the engine 12 to provide combustion air thereto. A turbocharger 18 includes a driven member (not shown) positioned in an exhaust stream. During engine operation, the exhaust stream causes the driven member to rotate and provide compressed air to the intake passage 16 prior to entry into the engine 12. It will be appreciated that the exhaust gas aftertreatment system 10 can also be used to treat exhaust output from a naturally aspirated engine or any other engine that does not include a turbocharger.

The exhaust aftertreatment system 10 may include a burner 26 that receives and burns fuel from a fuel delivery system 98 and air from an air delivery system 110. The burner 26 is positioned downstream from the turbocharger 18 and upstream from a number of exhaust aftertreatment devices. The exhaust aftertreatment devices may include a hydrocarbon injector 28, a diesel oxidation catalyst 30 and/or a diesel particulate filter 32, for example.

The burner 26 may be positioned in a heat transfer relationship with exhaust gas flowing through the main exhaust passageway 14. As shown in FIG. 1, the burner 26 may be at least partially disposed within a mixer housing 400. The mixer housing 400 may be a part of or disposed in the main exhaust passageway 14 so that the exhaust gas may flow into the mixer housing and around the burner 26 to transfer heat between the exhaust gas and the burner 26. The burner 26 may be used to heat the exhaust gas passing through the main exhaust passageway 14 to an elevated temperature that will enhance the efficiency of the DOC 30 and allow regeneration of the DPF 32. Additionally or alternatively, the burner 26 may be used prior to startup of the engine 12 to pre-heat the emissions system so that the effectiveness of the emissions system at engine startup is improved, thereby reducing cold-start emissions.

Figure 4:
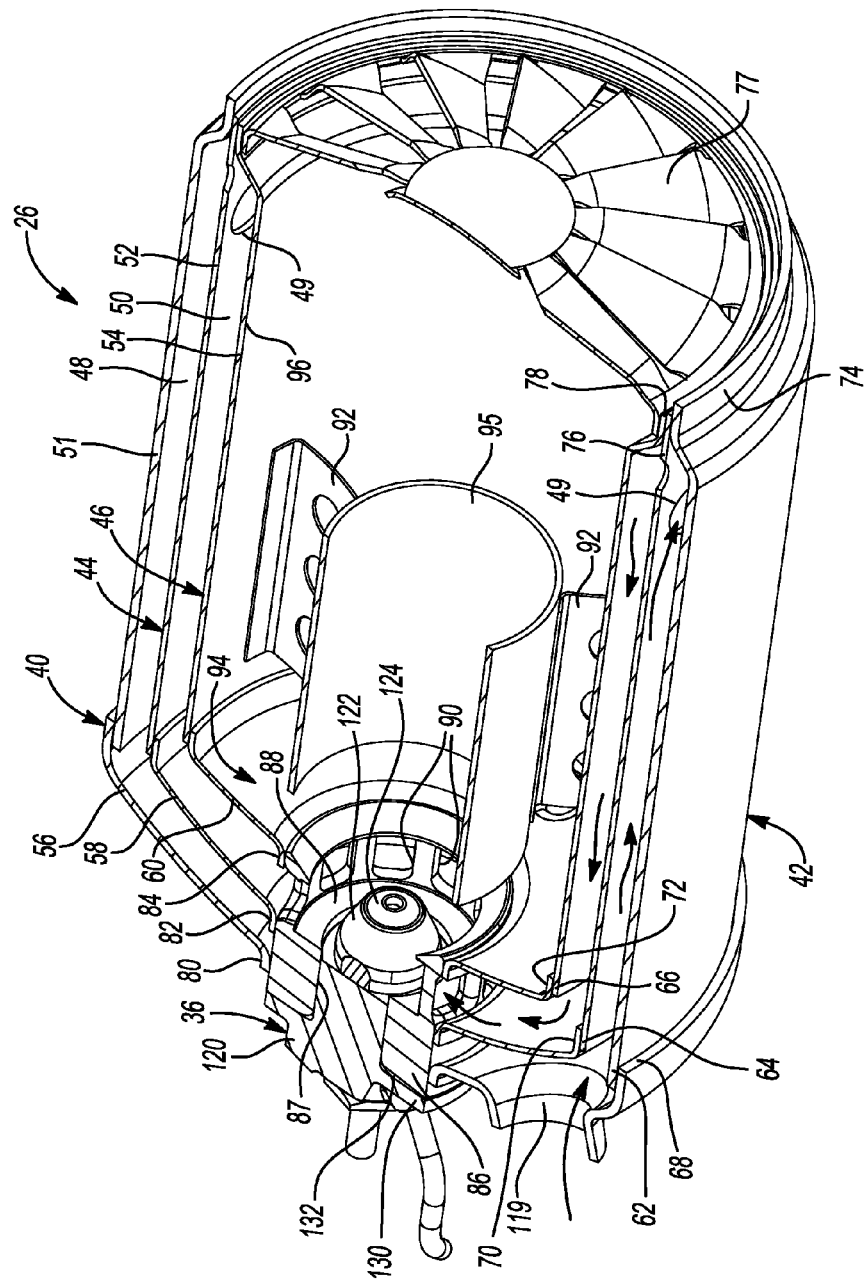
FIG. 4 is a perspective cross-sectional view of the burner.
Figure 5:
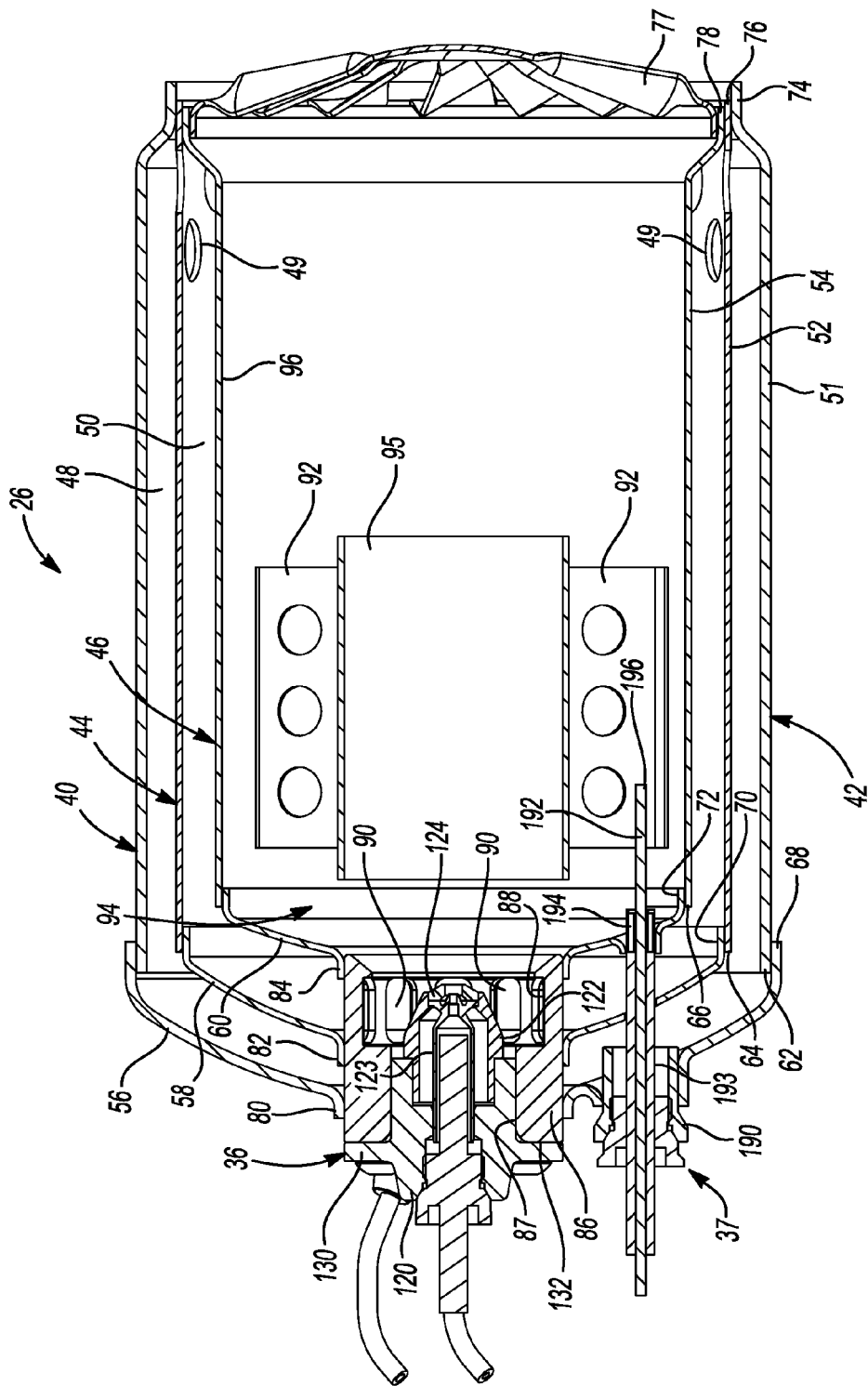
FIG. 5 is a cross-sectional view of the burner.
Figure 6:
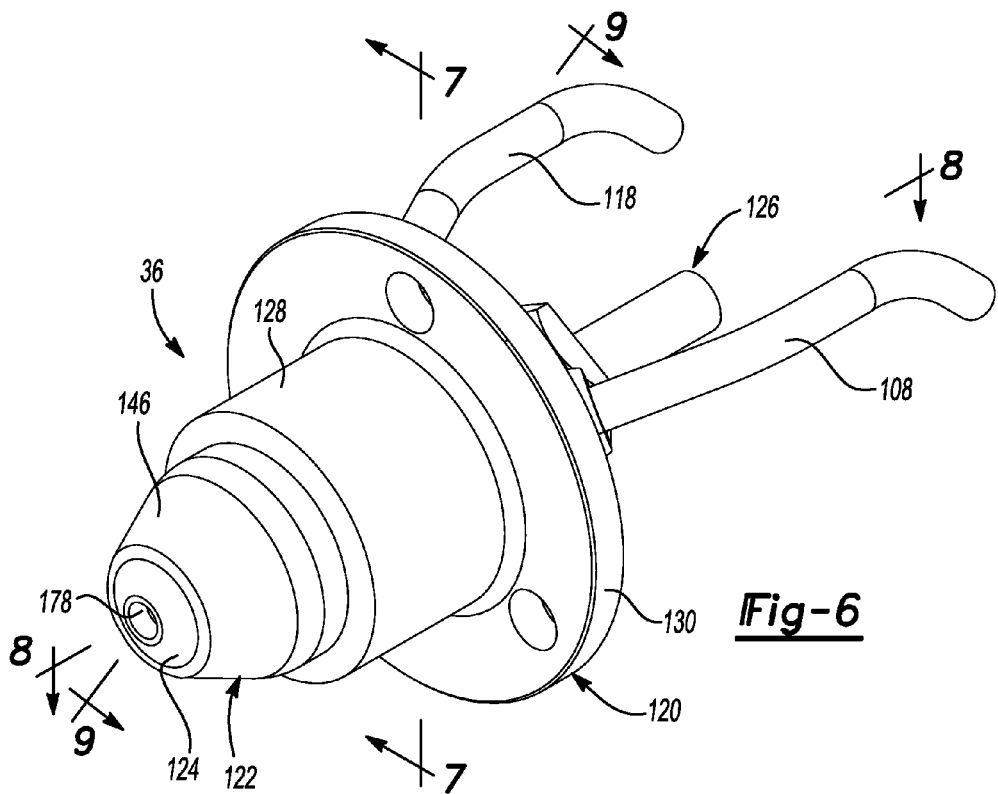
FIG. 6 is a perspective view of a nozzle assembly of the burner.

As shown in FIGS. 2-5, the burner 26 may include a housing assembly 40, a nozzle assembly 36, and a flame sensor assembly 37. The housing assembly 40 may be constructed as a multi-piece assembly of fabricated metal components. The housing assembly 40 may include an outer shell 42, an intermediate shell 44, and an inner shell 46. As shown in FIGS. 4 and 5, the outer, intermediate and inner shells 42, 44, 46 may be substantially concentric with each other such that the outer and intermediate shells 42, 44 may cooperate to define a first annular passage 48 therebetween, and the intermediate and inner shells 44, 46 may cooperate to define a second annular passage 50 therebetween. The first and second annular passages 48, 50 may be in fluid communication with each other through one or more apertures 49 in the intermediate shell 44.

The shells 42, 44, 46 may include generally cylindrical tube portions 51, 52, 54, respectively, and generally funnel-shaped backwall portions 56, 58, 60, respectively. The first ends 62, 64, 66 of respective tube portions 51, 52, 54 may be welded or otherwise attached to first ends 68, 70, 72 of the backwall portions 56, 58, 60, respectively. The second ends 74, 78 of respective outer and inner tube portions 51, 54 may be welded or otherwise attached to a second end 76 of the intermediate tube portion 52. An inner surface 96 of the inner shell 46 may define a combustion chamber 94 (shown in FIGS. 4 and 5). A flame tube 95 may be disposed within the combustion chamber 94 to act as a vaporizing element by inducing recirculation of oxygen-poor combustion products within the combustion chamber 94. The recirculation results in the complete vaporization of the fuel and may cause the flame within the combustion chamber 94 to be a blue flame, which is indicative of a clean-burning, low-emissions flame. The flame tube 95 may be connected to the inner surface 96 by one or more brackets 92. A vaned diffuser 77 may be connected to the housing assembly 40 at or proximate the second ends 74, 76, 78 of the tube portions 51, 52, 54 and may diffuse and swirl heated air exiting the burner 26.

Second ends 80, 82, 84 of the backwall portions 56, 58, 60 may fixedly support a nozzle bushing 86 that receives the nozzle assembly 36. The nozzle bushing 86 may be slidably relative to the second ends 80, 82, 84 to allow for thermal expansion and contraction of the intermediate and inner shells 44, 46 relative to each other and the outer shell 42. The nozzle bushing 86 may be an annular member including a main aperture 87 and a recessed portion 88. The recessed portion 88 may be disposed adjacent the combustion chamber 94 and may include a plurality of radially extending apertures 90 in fluid communication with the second annular passage 50. The nozzle assembly 36 is fixedly received in the main aperture 87. A portion of the nozzle assembly 36 may extend at least partially through the recessed portion 88 proximate the combustion chamber 94.

The backwall portion 56 of the outer shell 42 may include an air inlet port 119 that provides fluid communication between the air delivery system 110 and the first annular passage 48. During operation of the burner 26, air from the air delivery system 110 may flow in a serpentine flow path from the air inlet port 119, through the first and second annular passages and into the combustion chamber 94, as shown in FIG. 4. That is, the air from the air delivery system 110 may flow into the air inlet port 119, then through the first annular passage 48. The air may then flow through the apertures 49 into the second annular passage 50. The air may then flow through the annular passage 50 and into the combustion chamber 94 through the apertures 90 in the nozzle bushing 86. In the combustion chamber 94, the air and fuel may be ignited. After ignition, incoming air flowing through the first and second annular passages 48, 50 may absorb heat from the outer, intermediate and inner shells 42, 44, 46 and from flames in the combustion chamber 94 as the air flows through the serpentine flow path prior to combustion in the combustion chamber 94. In this manner, the air can be preheated prior to combustion and can cool the outer, intermediate and inner shells 42, 44, 46. The nozzle assembly 36 may inject and ignite a mixture of fuel received from the fuel delivery system 98 and air received from the air delivery system 110. The fuel may be a conventional diesel fuel or any hydrocarbon-based or hydrogen-based fuel, for example. The nozzle assembly 36 may be structured as a combined injector that injects both the fuel and air or separate injectors may be provided for the fuel and the air.

As shown in FIGS. 6-9, the nozzle assembly 36 may include a main body 120, an outer nozzle body 122, an inner nozzle body 123, a nozzle cap 124 and a glow plug 126. The main body 120 includes a generally cylindrical member having an outer surface 128 and a radially extending flange 130. The outer surface 128 may be received in the main aperture 87 such that the flange 130 abuts an axial end 132 of the nozzle bushing 86, as shown in FIGS. 4 and 5. A plurality of bolts 134 (FIGS. 2 and 3) may secure the flange 130 to the nozzle bushing 86. It will be appreciate that the main body 120 could be secured to the nozzle bushing 86 by any other suitable means, such as welding or a press fit, for example. In some embodiments, the main body 120 could be integrally formed with the nozzle bushing 86.

Figure 7:
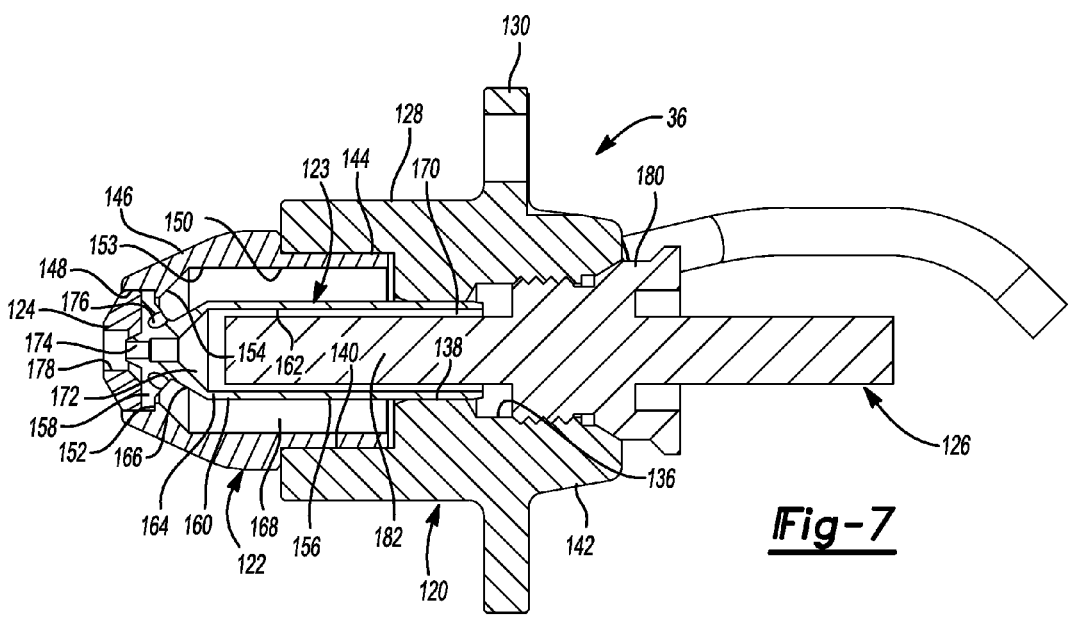
FIG. 7 is a cross-sectional view of the nozzle assembly taken along line 7-7 of FIG. 6.
Figure 8:
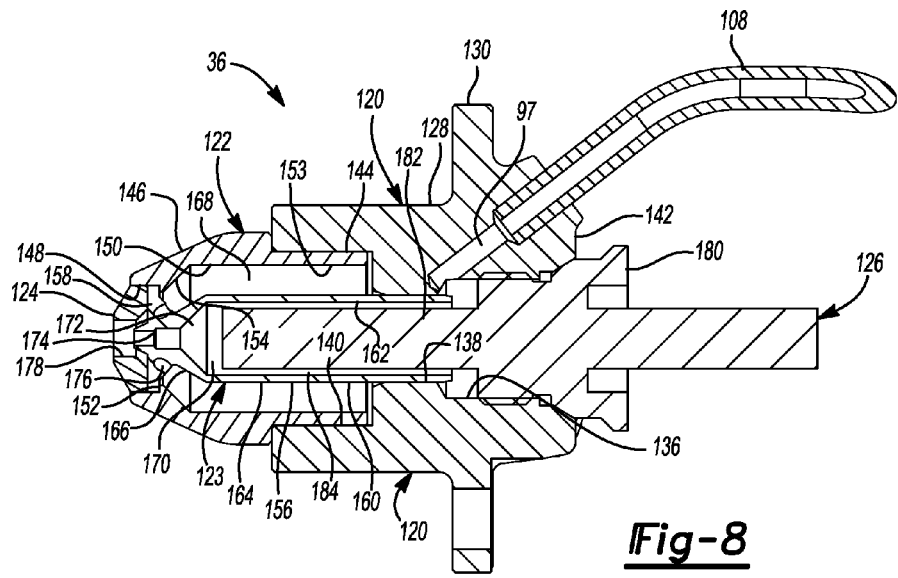
FIG. 8 is a cross-sectional view of the nozzle assembly taken along line 8-8 of FIG. 6.
Figure 9:
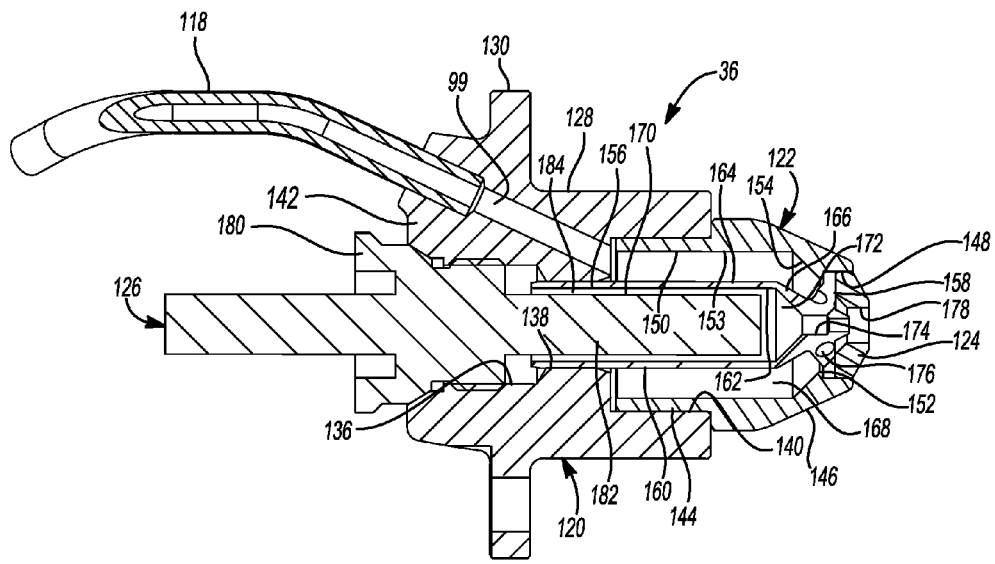
FIG. 9 is a cross-sectional view of the nozzle assembly taken along line 9-9 of FIG. 6.

As shown in FIGS. 7-9, the main body 120 may also include a first recess 136, a central aperture 138 and a second recess 140. The glow plug 126 may threadably engage the first recess 136 and may extend through the central aperture 138 and the second recess 140. The outer nozzle body 122 may be fixedly received in the second recess 140. The inner nozzle body 123 may be slidably received in the central aperture 138 to allow for axial expansion and contraction of the inner nozzle body 123 to allow for axial thermal expansion and contraction of the inner nozzle body 123.

The main body 120 may also include a fuel inlet passage 97 (shown in FIG. 8) and an air inlet passage 99 (shown in FIG. 9). The fuel inlet passage 97 may extend through an end 142 of the main body 120 to the first recess 136. The air inlet passage 99 may extend through the end 142 of the main body 120 to the second recess 140.

As shown in FIG. 1, the fuel inlet passage 97 is in fluid communication with the fuel delivery system 98. The fuel delivery system 98 may include a fuel tank 100, a fuel filter 102, and a fuel pump 104 interconnected by a fuel line 108. In some embodiments, the fuel pump 104 may be a metering-type pump whereby a pump motor speed is increased or decreased to control the fuel delivery rate. The pump 104 may be controlled based on feedback from the flame sensor assembly 37. In some embodiments, the fuel delivery system 98 could include a fuel block (not shown) controlling delivery of the fuel. The fuel line 108 may be directly or indirectly coupled with the fuel inlet passage 97. Operation of the components of the fuel delivery system 98 selectively provides fuel to the nozzle assembly 36. The air inlet passage 99 is in fluid communication with the air delivery system 110. The air delivery system 110 may include a secondary air filter 112 and a MAF sensor 114. A compressor 116 is in receipt of air that is passed through the secondary air filter 112 and the MAF sensor 114. The compressor 116 may include a portion of a supercharger, the turbocharger 18 or a stand-alone electric compressor. Output from the compressor 116 is provided to the air inlet passage 99 via an air supply line 118. The air supply line 118 also supplies air to the air inlet port 119 of the outer shell 42.

In some embodiments, a valve 117 may be disposed downstream of the compressor 116 to control airflow into the nozzle assembly 36 and into the inlet 119. The valve 117 may be configured to ensure a predetermined amount of air flows into the nozzle assembly 36. For example, in some embodiments, the valve 117 may be configured so that air pressure at the inlet of the nozzle assembly 36 is about five pounds per square inch (psi) higher than air pressure at the inlet 119. It will be appreciated, however, that the majority of the air flowing through the air supply line 118 may flow into the inlet 119 with a relatively small portion being diverted to the nozzle assembly 36 to atomize the fuel in the nozzle assembly 36.

Referring again to FIGS. 6-9, the outer nozzle body 122 may include a cylindrical portion 144 and a frustoconical portion 146. The cylindrical portion 144 may be fixedly received in the second recess 140 of the main body 120 such that the frustoconical portion 146 abuts an end of the main body 120. The outer nozzle body 122 may be welded or otherwise fixed to the main body 120.

The outer nozzle body 122 may also include first and second recesses 148, 150. The first recess 148 may be partially defined by an annular flange 152. The second recess 150 may extend from an axial end of the cylindrical portion 144 through a portion of the frustoconical portion 146 and into the first recess 148. The second recess 150 may be defined by a cylindrical annular surface 153 and a tapered annular surface 154 adjacent the first recess 148.

The inner nozzle body 123 may include a body portion 156, a and a head portion 158. The body portion 156 may extend from the first recess 136 of the main body 120 through the central aperture 138 and through a portion of the second recess 140. The body portion 156 may include an outer surface 160 and an inner surface 162. The outer surface 160 may include a cylindrical portion 164 and a tapered portion 166. The cylindrical portion 164 may be received in the central aperture 138 by a slip fit, for example. The cylindrical portion 164 and the tapered portion 166 of the outer surface 160 may cooperate with the cylindrical annular surface 153 and the tapered annular surface 154, respectively, of the outer nozzle body 122 to define an annular passageway 168 in fluid communication with the air inlet passage 99. The inner surface 162 of the body portion 156 of the inner nozzle body 123 may define a generally cylindrical interior cavity 170 having a tapered end 172. The interior cavity 170 may be in fluid communication with the fuel inlet passage 97 via the first recess 136.

The head portion 158 of the inner nozzle body 123 may extend radially outward from an end of the tapered portion 166 of the body portion 156. The nozzle cap 124 and head portion 158 may be received in the first recess 148 of the outer nozzle body 122. The nozzle cap 124 may be welded to the outer nozzle body 122, thereby securing the head portion 158 within the first recess 148. The head portion 158 may include a fuel discharge aperture 174 and a plurality of air discharge apertures 176. The fuel discharge aperture 174 may be in fluid communication with the interior cavity 170 and an exit aperture 178 of the nozzle cap 124. The air discharge apertures 176 may be in fluid communication with the annular passageway 168 and the exit aperture 178 of the nozzle cap 124. Fuel discharged from the fuel discharge aperture 174 may be atomized in the exit aperture 178 and/or downstream of the exit aperture 178 by the high-pressure air discharged from the air discharge apertures 176.

The glow plug 126 may include a bushing portion 180 and a heater rod 182. The glow plug 126 can be a 120W Kyocera SiN glow plug, for example, or any other suitable glow plug or other heating element. The bushing portion 180 may be threadably received in the first recess 136 of the main body 120. The heater rod 182 may extend from the bushing portion 180 into the interior cavity 170. The heater rod 182 and the interior cavity 170 may be sized such that an annular space 184 exists between the heater rod 182 and the inner surface 162 of the body portion 156 of the inner nozzle body 123.

While the nozzle assembly 36 is described above as including an integrated glow plug, additionally or alternatively, a spark plug or other ignition device could be provided for igniting the fuel and air. The spark plug or other ignition device could be separate and distinct from the nozzle assembly 36 or integrated therein.

A control module 38 (FIG. 1) is provided to monitor and control the flows of fuel and air through the nozzle assembly 36 and monitor and control operation of the glow plug 126 using any suitable processor(s), sensors, flow control valves, electric coils, etc. The control module 38 may include or be part of an Application Specific Integrated Circuit (ASIC), an electronic circuit, a processor (shared, dedicated or group) and/or memory (shared, dedicated or group) that execute one or more software or firmware programs, a combinational logic circuit and/or other suitable components that provide the described functionality. The control module 38 may be a part of or include a control unit controlling one or more other vehicle systems. Alternatively, the control module 38 may be a control unit dedicated to the exhaust aftertreatment system 10.

The control module 38 may operate the glow plug 126 in one of a plurality of operational modes to serve specific purposes. For example, the control module 38 may operate the glow plug 126 at a high power level to heat the fuel in the inner nozzle body 123 to a temperature beyond the fuel's auto-ignition point so that when the fuel comes into contact with pressurized air in the exit aperture 178 and/or in the combustion chamber 94, the fuel will spontaneously ignite. Once the burner 26 is lit, the control module 38 may discontinue or reduce the electrical power to the glow plug 126 to reduce the temperature of the glow plug 126 to a point at which the glow plug 126 preheats the fuel to allow for passive vaporization of the fuel in the flame tube 95.

Periodically and/or at the end of a burn cycle (i.e., when the control module 38 determines that the aftertreatment devices have been adequately heated to a point at which the burner 26 need not be operated to heat up the aftertreatment devices), the glow plug 126 may be operated in a cleaning mode or decoking mode. In the cleaning mode or decoking mode, the supply of fuel to the nozzle assembly 36 may be shut off and the glow plug temperature may be increased to burn off any varnish and/or carbon deposits that may have accumulated on the nozzle assembly 36. After this cleaning cycle is complete, the glow plug 126 may be powered down to a low level and the temperature of the glow plug 126 may be monitored (it will be appreciated that the temperature of the glow plug 126 may be monitored at any time during operation of the glow plug 126). Monitoring of the glow plug temperature may be accomplished by way of a calculation based on the resistance of the glow plug 126, which can be determined based on the voltage and current supplied to the glow plug 126. In some embodiments, air may continue to be pumped through the nozzle assembly 36 during the cleaning and/or monitoring cycles to prevent soot and/or other debris from entering the nozzle assembly 36 from the combustion chamber 94.

Monitoring of the temperature of the glow plug 126 based on the glow plug resistance can be carried out during any or all of the operational modes described above. The control module 38 may adjust a power level (e.g., a pulse width modulation duty cycle) of the glow plug 126 based on the temperature of the glow plug 126. In this manner, the control module 38 may supply no more electrical power than is necessary to achieve a particular purpose. Monitoring the glow plug temperature and adjusting the power level accordingly can also ensure that the glow plug 126 is not heated beyond its rated temperature threshold, nor subjected to thermal shock due to heating and/or cooling faster than a threshold rate, thereby preventing damage to the glow plug 126 due to overheating.

Referring now to FIGS. 1 and 5, the flame sensor assembly 37 may be supported by the backwall portions 56, 58, 60 of the housing assembly 40. The flame sensor assembly 37 may include a bushing 190, a flame rod 192, an insulator 193, and a heating element 194 (shown schematically in FIG. 5). The bushing 190 may engage one or more of the backwall portions 56, 58, 60 and may receive the flame rod 192 and insulator 193. The insulator 193 may be a tube formed from Alumina and may surround a portion of the flame rod 192. The heating element 194 may be embedded in the insulator 193 at a location proximate the backwall 60 (i.e., at the entry point to the combustion chamber 94). The insulator 193 may pass through and slidably engage the backwalls 58, 60, and clearance may be managed to reduce leakage of air therebetween.

The flame rod 192 may be an elongated high-temperature wire including an electrode 196 that may be positioned at least partially within or proximate the combustion chamber 94. A bias voltage may be applied to the flame sensor 192 to create an electric field from the electrode 196 to a ground such as the inner shell 46. When voltage is applied, an electric field may radiate from the electrode 196 to the ground. If free ions are present in the field, an ion current may flow. The magnitude of the ion current provides an indication of the density of the ions. The control module 38 detects and receives signals from the flame sensor assembly 37 indicative of the ion current to determine the presence or absence of a flame within the combustion chamber 94. The sensor assembly 37 may also determine if the insulator 193 is fouled. While the flame sensor 192 is described above as being an ion sensor, it will be appreciated that, in some embodiments, the flame sensor 192 could include any other type of flame sensor such as an optical sensor or a thermocouple, for example.

The heating element 194 of the sensor assembly 37 may be include a resistance heater embedded in the insulator, for example, or any suitable electrical resistance heating device. The heating element 194 is in conductive heat transfer relation with the insulator 193 and may be coaxial with the electrode 196. The insulator 193 may electrically isolate the heating element 194 from the electrode 196 and any metallic components of the housing assembly 40 and may act as a heat-resistant structural support. The heating element 194 may be at least partially disposed in the combustion chamber 94. In an exemplary embodiment, the heating element 194 may span at least about 10 mm in length and may be disposed about 20 mm from a distal tip of the electrode 196.

As will be subsequently described, the heating element 194 may be operable in a cleaning or decoking mode and in a monitoring mode. In the decoking mode, the control module 38 may cause electrical current to be applied to the heating element 194 to burn off any deposits and/or contamination that may accumulate on the insulator 193 due to exposure to exhaust gases and/or combustion in the combustion chamber 94. In the monitoring mode, the control module 38 may apply a reduced electrical current to the heating element 194 and determine a resistance of the heating element 194 based on the voltage and current applied to the heating element 194. From the resistance, the temperature of the heating element 194 can be calculated or determined from a lookup table. In this manner, the control module 38 can use the heating element 194 as a combustion chamber temperature sensor. That is, the temperature of the heating element 194 indicates the temperature of the combustion chamber 94. The control module 38 may compare temperature data acquired from the heating element 194 with data from the flame sensor 192. If the data from the heating element 194 indicates the presence of a flame in the combustion chamber 94 and the flame sensor 192 does not indicate the presence of a flame, the control module 38 may operate the burner 26 in a reduced capacity mode or a "limp mode" rather than completely disabling the burner 26.

Fouling of the insulator 193 may occur through deposition of soot, oil and/or other contaminants that form a conductive bridge from the flame rod 196 to ground where the insulator passes through the backwall 60. When the insulator 193 is fouled, it may not be possible to differentiate between ion current flow through a flame and leakage current to ground through the conductive contaminants. Therefore, the control module 38 may determine whether the insulator 193 is sufficiently clean to allow the flame sensor assembly 37 to function correctly prior to ignition of the burner 26. If the flame sensor assembly 37 is determined to be ready for operation, the control module 38 may ignite the burner 26.

The control module 38 may evaluate a number of other parameters including presence of combustion and temperature of the exhaust gas within the main exhaust passageway 14 at a location downstream from the burner 26 to determine when to cease the supply of fuel and air to the burner 26. For example, the control module 38 may receive signals from one or more temperature sensors located within the burner 26 or within the main exhaust passageway 14 to perform a closed loop control by operating the burner 26 to maintain a desired temperature at a particular location. If combustion unexpectedly extinguishes, the control module 38 may cease the supply of fuel and/or attempt to relight the burner 26. Other control schemes are also within the scope of the present disclosure.

Figure 10:
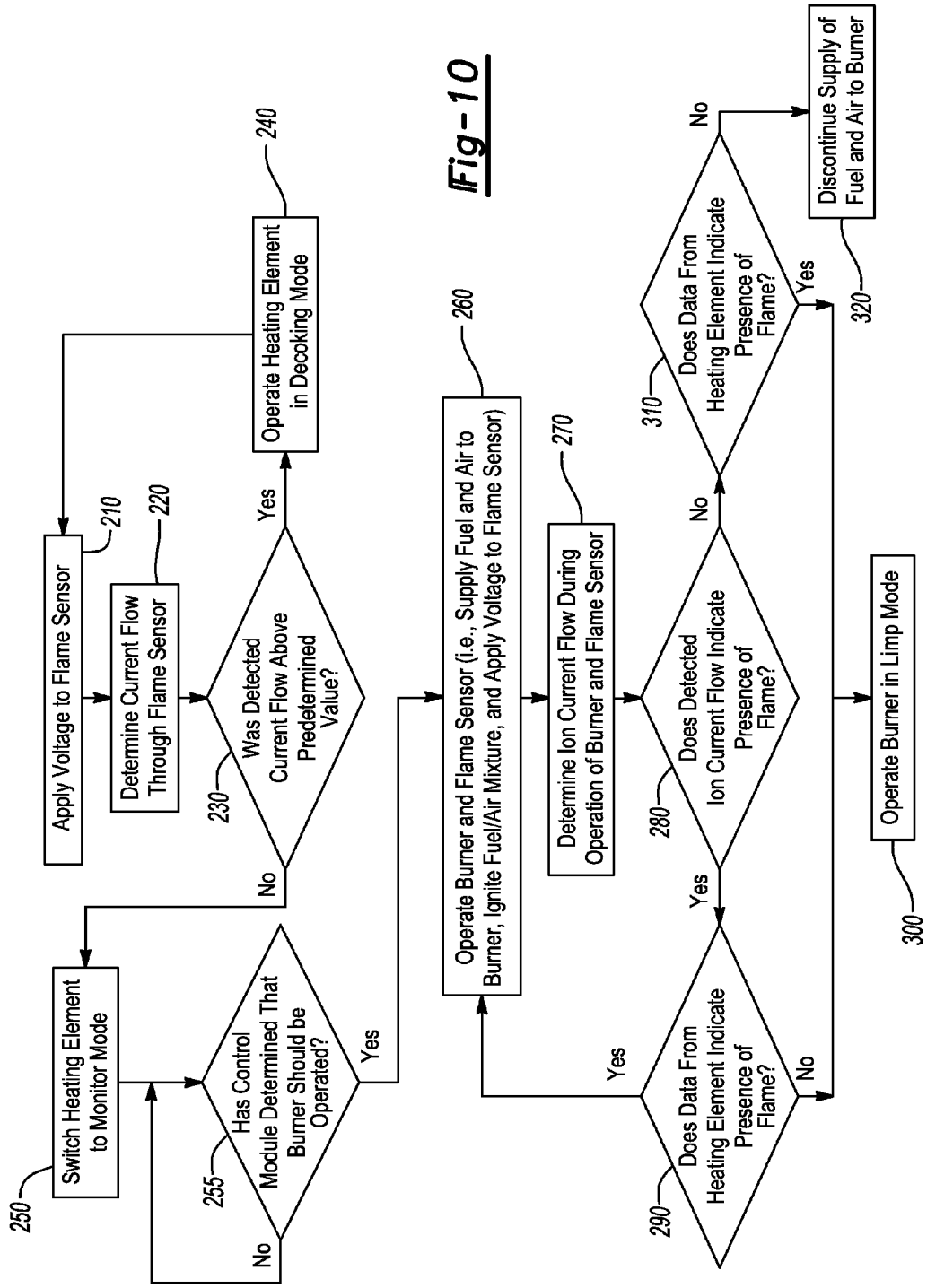
FIG. 10 is a flow chart illustrating operation of a flame sensor of the burner.

With reference to FIG. 10, a method of operating the sensor assembly 37 will be described in detail. At step 210, prior to ignition of the burner 26, the control module 38 may cause a bias voltage to be applied to the flame sensor 192. At step 220, a resulting current flow through the flame sensor 192 may be determined. At step 230, the control module 38 may determine whether the current flow through the flame sensor 192 (determined at step 220) is less than or greater than a predetermined value. Any appreciable current flow through the flame sensor 192 when a flame is not present in the combustion chamber 94 indicates that soot and/or other contaminants have accumulated on the insulator 193 and the detected current flow is a leakage current flow through contamination on the insulator 193. Therefore, the predetermined value may be a very small value or any value that indicates an amount of contamination on the insulator 193 that could affect the performance of the flame sensor 192.

If the control module 38 determines that the current flow through the flame sensor 192 is greater than the predetermined value at step 230, the control module 38 may cause the heating element 194 to operate in the decoking mode at step 240. In the decoking mode, electrical power may be applied to the heating element 194 by pulse-width modulation, for example, to raise the heating element 194 to a temperature (e.g., about 650 degrees Celsius or more) that will burn soot deposits and/or other contamination off of the insulator 193. The control module 38 may vary the duty cycle of the pulse-width modulated power to the heating element 194 to control the temperature of the heating element 194. The temperature of the heating element 194 may be determined by first calculating the resistance of the heating element 194 based on a known voltage and detected current flow therethrough. The temperature of the heating element 194 can then be determined based on the resistance by way of a calculation or a lookup table, for example.

During operation of the heating element 194 in the decoking mode, the control module 38 may continue to monitor the current flowing through the flame sensor 192, as described above with respect to steps 210-230. As the soot and/or other contaminants are burned off of the insulator 193, the current through the flame sensor 192 may drop off to an acceptable level. Once the current flow has reached an acceptable level, the control module 38 may cause the heating element 194 to operate in the monitor mode at step 250.

In the monitor mode, the control module 38 may cause a reduced duty cycle to be applied to the heating element 194. The duty cycle applied to the heating element 194 in the monitor mode may be any duty cycle that allows calculation of the electrical resistance of the heating element 194 so that the temperature of the heating element 194 can be monitored. In this manner, the heating element 194 may provide feedback to the control module 38 indicating the temperature of the combustion chamber 94 and whether a flame is present in the combustion chamber 94. In some embodiments, no more current is provided to the heating element 194 in the monitor mode than is necessary to calculate the resistance of the heating element 194.

At step 255, the control module 38 may determine whether conditions are such that the burner 26 should be operated to heat exhaust gas in the main exhaust passageway 14 and/or one or more of the aftertreatment devices. If the control module 38 determines that the burner 26 should be operated, the control module 38 may, at step 260, operate the burner 26 and continue to operate the flame sensor assembly 37. That is, fuel and air may be supplied to the burner 26 and ignited therein, and voltage may be applied to the flame sensor 192. At step 270, the control module 38 may determine the ion current flow through the flame sensor 192 as a result of the bias voltage applied thereto. At step 280, the control module 38 may determine whether the ion current flow through the flame sensor 192 indicates the presence of a flame in the combustion chamber 94. If data from the flame sensor 192 indicates that a flame is present in the combustion chamber 94, the control module 38 may determine, at step 290, whether temperature data received from the heating element 194 (during operation of the heating element 194 in the monitor mode) also indicates the presence of a flame in the combustion chamber 94. If temperature data from the heating element 194 also indicates the presence of a flame in the combustion chamber 94, operation of the burner 26 may continue, as necessary. If temperature data from the heating element 194 indicates a lack of a flame in the combustion chamber 94, the control module 38 may operate the burner 26 in a reduced capacity mode or a limp mode at step 300. The control module 38 may also generate an error signal that may alert the driver of the vehicle that a fault has been detected in the aftertreatment system 10 and that service of the aftertreatment system 10 may be necessary.

If, at step 280, data from the flame sensor 192 indicates that a flame is not present in the combustion chamber 94, the control module 38 may determine, at step 310, whether temperature data received from the heating element 194 also indicates the lack of a flame in the combustion chamber 94. If temperature data from the heating element 194 also indicates the lack of a flame in the combustion chamber 94, the control module 38 may shutdown the burner 26 (i.e., discontinue the supply of fuel and air to the burner 26) at step 320. If temperature data from the heating element 194 indicates the presence of a flame in the combustion chamber 94, the control module 38 may operate the burner 26 in a reduced capacity mode or a limp mode at step 300 and generate an error signal alerting the driver that a fault has been detected in the aftertreatment system 10.

It will be appreciated that the response-time of the heating element 194 to changes in temperature may be slower than the response-time of the flame sensor 192. Therefore, the control module 38 may account for the lagging response-time of the heating element 194 when determining (at steps 290 and 310) whether temperature data from the heating element 194 indicates the presence or lack of a flame in the combustion chamber 94.

With reference to FIGS. 1 and 11-13, the mixer housing 400 will be described in detail. The mixer housing 400 may support the burner 26 relative to the main exhaust passageway 14 and may fluidly couple upstream and downstream portions 401, 403 (FIGS. 1 and 11) of the main exhaust passageway 14. The mixer housing 400 may include a main body 402, an inlet body 404, a first vaned diffuser 406 and a second vaned diffuser 408.

The main body 402 may include a tubular shell 410 and an annular backwall 412. The tubular shell 410 may include first and second axial ends 414, 416 and an inlet opening 418 disposed between the first and second axial ends 414, 416. The backwall 412 may be fixedly attached to or integrally formed with the tubular shell 410 at the first axial end 414. The first diffuser 406 may be disposed within the tubular shell 410 and may be fixed relative thereto between the inlet opening 418 and the second axial end 416. The second diffuser 408 may be fixedly attached to the tubular shell 410 at or proximate the second axial end 414. In this manner, the mixer housing 400 may define a first chamber 420 within the tubular shell 410 between the backwall 412 and the first diffuser 406 and a second chamber 422 within the tubular shell 410 between the first and second diffusers 406, 408. The second axial end 414 and the second diffuser 408 may define an outlet of the second chamber 422 that is fluidly coupled with the downstream portion 403 of the main exhaust passageway 14.

The first diffuser 406 and the backwall 412 may both be annular members including central openings 424, 426, respectively. The burner 26 may extend through the openings 424, 426 and the outer shell 42 of the burner 26 may fixedly engage the backwall 412 and the first diffuser 406. In this manner, at least a portion of the housing assembly 40 of the burner 26 may be received in the first chamber 420. The tube portions 51, 52, 54 of the housing assembly 40 of the burner 26 may be substantially concentric with the tubular shell 410 of the mixer housing 400 (i.e., the tube portions 51, 52, 54 may share a common longitudinal axis A1 with the tubular shell 410). It will be appreciated, however, that in some embodiments, the tube portions 51, 52, 54 may be eccentric relative to the tubular shell 410.

The second ends 74, 76, 78 of the tube portions 51, 52, 54 of the housing assembly 40 may extend into the second chamber 422 such that heated air and combustion gas may exit the burner 26 through its diffuser 77 and flow into the second chamber 422 where the heated air and combustion gas may mix with exhaust gas from the main exhaust passageway 14. The mixture of exhaust gas and heated gas from the burner 26 may exit the mixer housing 400 through the second diffuser 408 and flow into the downstream portion 403 of the main exhaust passageway 14.

The inlet body 404 may be a tubular member including a longitudinal axis A2, a first axial end 430 and a second axial end 432. The first axial end 430 may be fluidly coupled with the upstream portion 401 of the main exhaust passageway 14. The second axial end 432 may be fluidly coupled with the inlet opening 418 of the main body 402. In this manner, the inlet body 404 feeds exhaust gas from the upstream portion 401 of the main exhaust passageway 14 into the first chamber 420 of the mixer housing 400.

Figure 11:
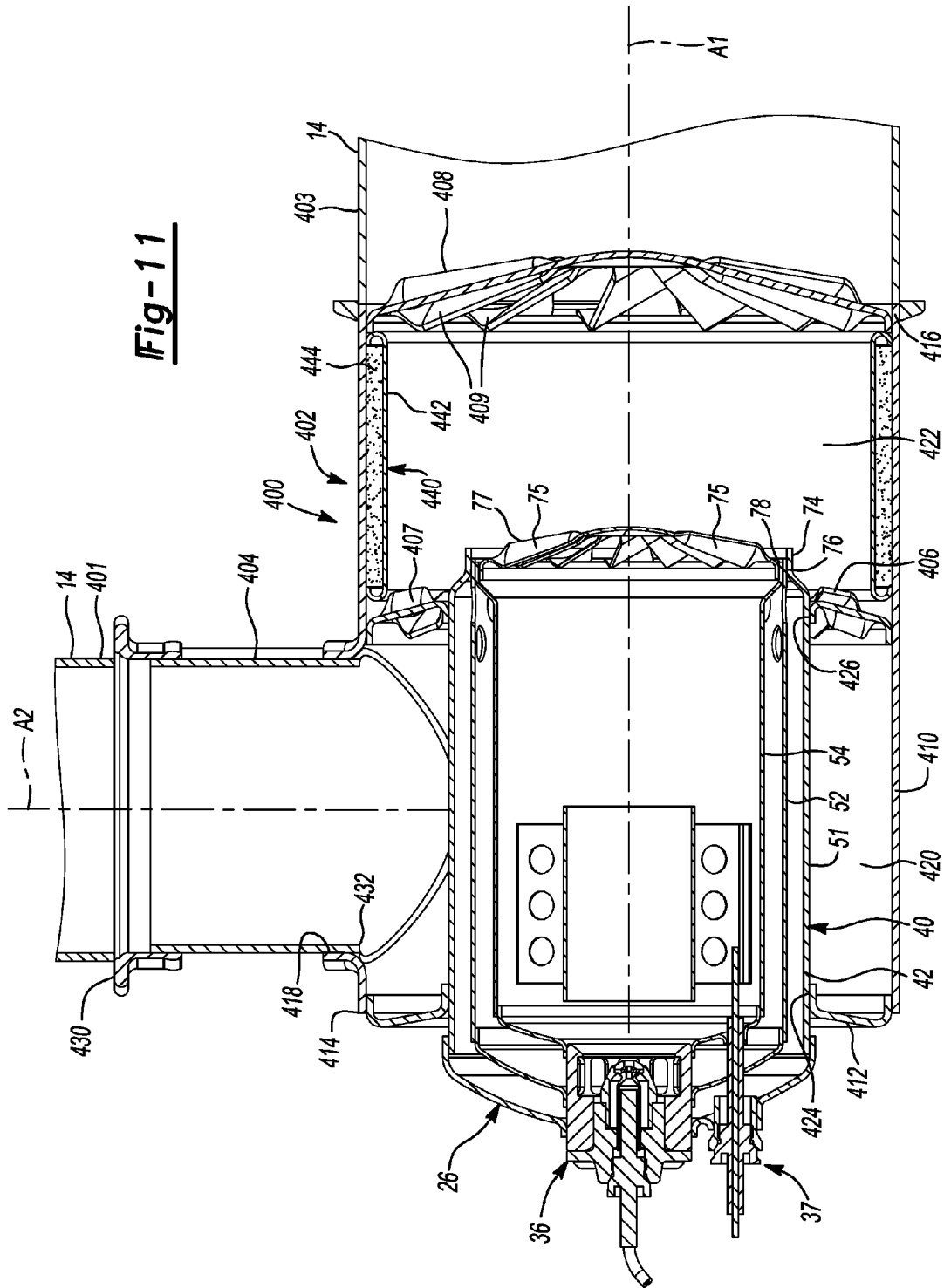
FIG. 11 is a cross-sectional view of the burner installed in a mixer housing according to the principles of the present disclosure.
Figure 12:
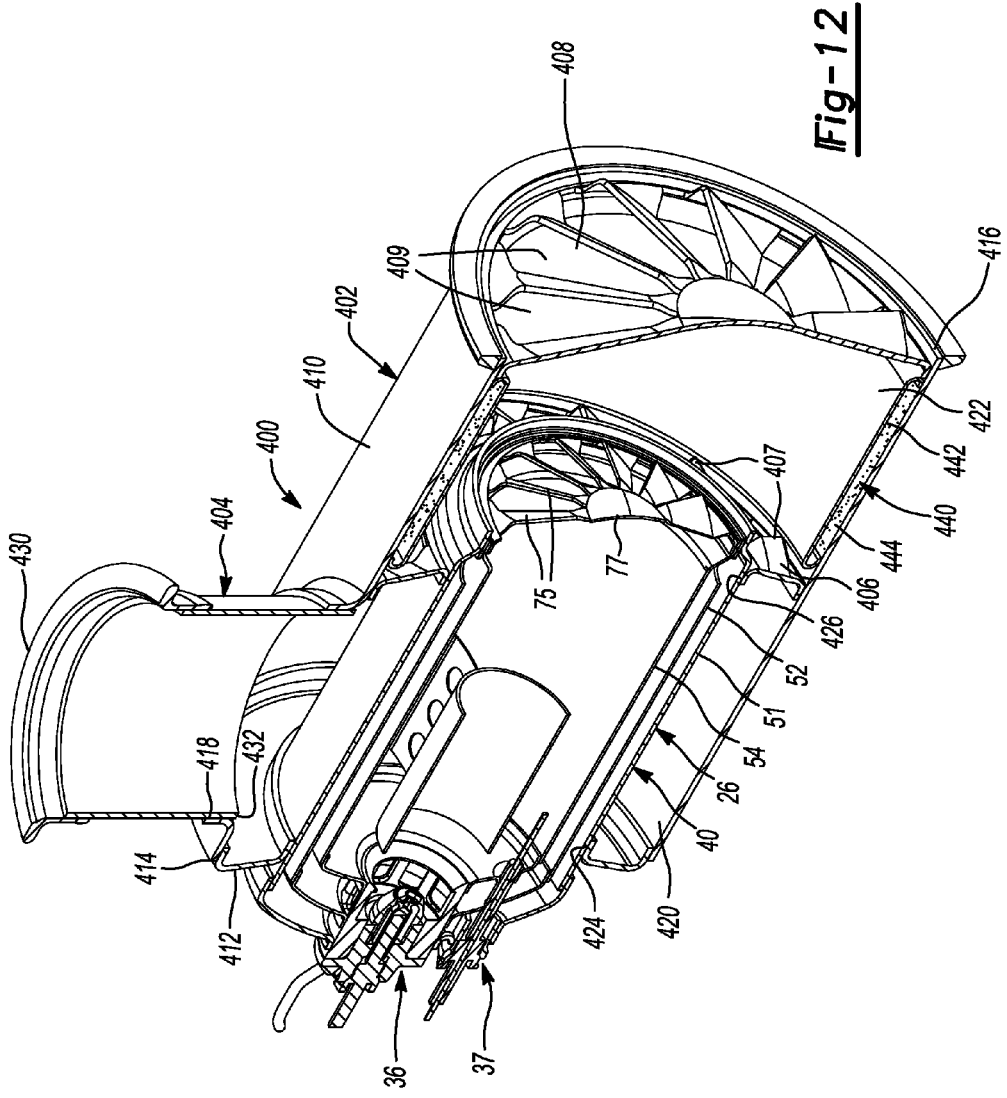
FIG. 12 is a perspective cross-sectional view of the burner and mixer housing of FIG. 11.
Figure 13:
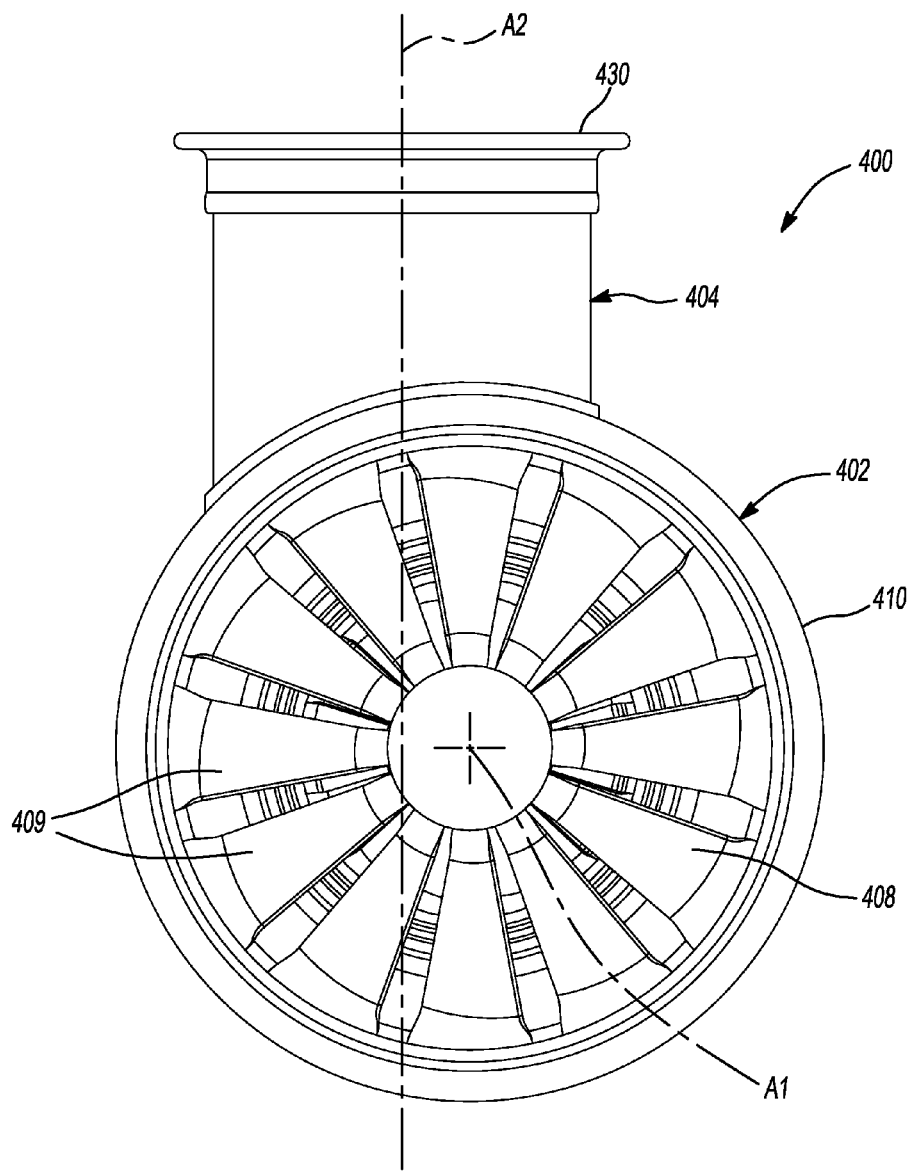
FIG. 13 is a side view of the mixer housing of FIG. 11.

The inlet body 404 may be positioned relative to the main body 402 such that the longitudinal axis A2 of the inlet body 404 may be substantially perpendicular to the longitudinal axis A1 of the tubular shell 410 (as shown in FIGS. 11 and 13) and offset from the longitudinal axis A1 so that the longitudinal axes A1, A2 do not intersect each other (as shown in FIG. 13). In other embodiments, the axis A2 may be parallel to and intersect the axis A1 (i.e., the inlet body 404 may extend radially from the main body 402).

The offset position of the inlet body 404 relative to the main body 402 shown in FIG. 13 (i.e., the offset position of the axis A2 relative to the axis A1) may allow at least a portion of the exhaust gas to enter the first chamber 420 generally tangentially. This tangential flow into the first chamber 420 may induce a swirled flow within the first chamber 420 and may facilitate a more uniform flow of the exhaust gas through the annular space around the housing assembly 40, thereby improving the transfer of heat from the exterior surfaces of the housing assembly 40 to the exhaust gas. The exhaust gas in the first chamber 420 may be fluidly isolated from the air and combustion gas within the burner 26 until the exhaust gas and the air and combustion gas from the burner 26 are combined in the second chamber 422.

From the first chamber 420, the exhaust gas may flow through the first diffuser 406 and into the second chamber 422. Vanes 407 of the first diffuser 406 may further induce swirling of the exhaust gas passing therethrough. The vanes 75 of diffuser 77 of the burner 26 may induce swirling of the heated air and combustion gas exiting the burner 26. The swirling flow of exhaust gas, heated air and combustion gas within the second chamber 422 may facilitate mixing of the exhaust gas with the heated air and combustion gas and facilitate heating of the exhaust gas in the second chamber 422. The vanes 409 of the second diffuser 408 may further induce swirling of the mixture of the exhaust gas and heated air and combustion gas as it exits the second chamber 422 and flows into the downstream portion 403 of the main exhaust passageway 14. In this manner, the exhaust gas in the downstream portion 403 of the main exhaust passageway 14 may be sufficiently heated prior to interaction with the aftertreatment devices 28, 30, 32 (FIG. 1).

In some embodiments, the vanes 75, 407, 409 of the diffusers 77, 406, 408 may all be angled or oriented in the same direction so that the diffusers 77, 406, 408 all generate a swirling effect in the same rotational direction. In other embodiments, one of the sets of vanes 75, 407, 409 may be angled or oriented in the opposite direction so that one of the diffusers 77, 406, 408 generates a swirling effect in an opposite rotational direction relative to the rotational directions of the swirling effects of the other two diffusers 77, 406, 408.

In some embodiments, the main body 402 may include an insulation member 440 (FIG. 11) that lines the inner diameter of the tubular shell 410 in the second chamber 422. The insulation member 440 may include an annular shell 442 encasing a fibrous insulation material 444, for example, and may reduce heat loss from the second chamber 422 (i.e., reduce the transfer of heat from the second chamber 422 to the ambient environment). This improves the efficiency of the mixer housing 400 and burner 26 and also maintains the outer surface of the tubular shell 410 at a relatively moderate temperature.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust aftertreatment system comprising:
   a first housing including first and second chambers, the first chamber including an exhaust gas inlet receiving exhaust gas from an engine, the second chamber receiving exhaust gas from the first chamber and including an exhaust gas outlet;
   a burner including a second housing and a combustion chamber disposed within the second housing, the second housing at least partially disposed within the first chamber, the burner supplying heated gas to the second chamber separately from the exhaust gas, the heated gas within the burner being fluidly isolated from exhaust gas in the first chamber, the second housing being in a heat transfer relationship with exhaust gas in the first chamber;
   a first swirl-inducing diffuser disposed between the first and second chambers and surrounding the second housing;
   a second swirl-inducing diffuser attached to the first housing at the exhaust gas outlet of the second chamber; and
   a third swirl-inducing diffuser disposed at an outlet of the second housing.

2. The exhaust aftertreatment system of claim 1, wherein an outlet of the second housing is disposed within the second chamber downstream of an outlet of the first chamber.

3. The exhaust aftertreatment system of claim 1, wherein one of the first, second and third swirl-inducing diffusers causes fluid flowing therethrough to swirl in a first rotational direction and another of the first, second and third swirl-inducing diffusers causes fluid flowing therethrough to swirl in a second rotational direction that is opposite the first rotational direction.

4. The exhaust aftertreatment system of claim 1, wherein the second chamber is at least partially defined by an annular insulation member.

5. The exhaust aftertreatment system of claim 1, wherein the first chamber defines an annular space that surrounds the second housing.

6. The exhaust aftertreatment system of claim 5, wherein the exhaust gas inlet of the first housing includes a laterally outwardly extending tube, the tube including a longitudinal axis that is perpendicular to a longitudinal axis of the annular space of the first housing, and wherein the longitudinal axis of the tube does not intersect the longitudinal axis of the annular space.

7. An exhaust aftertreatment system comprising:
   a first housing including a tubular body defining first and second chambers, the first chamber including an inlet receiving exhaust gas from an engine, the second chamber in fluid communication with the first chamber and including an outlet discharging the exhaust gas upstream of an aftertreatment device;
   a first diffuser disposed within the tubular body and defining an outlet of the first chamber and an inlet of the second chamber;
   a burner including a second housing and a combustion chamber disposed within the second housing, the second housing at least partially disposed within the first chamber, the burner supplying heated gas to the second chamber separately from the exhaust gas, the second housing being in a heat transfer relationship with exhaust gas in the first chamber, the burner including a second diffuser disposed at an outlet of the second housing; and
   a third diffuser attached to the first housing at the outlet.

8. The exhaust aftertreatment system of claim 7, wherein the heated gas within the burner is fluidly isolated from exhaust gas in the first chamber.

9. The exhaust aftertreatment system of claim 7, wherein an outlet of the second housing is disposed within the second chamber downstream of the first chamber.

10. The exhaust aftertreatment system of claim 7, wherein the first chamber defines an annular space that surrounds the second housing.

11. The exhaust aftertreatment system of claim 7, wherein the first diffuser causes fluid flowing therethrough to swirl in a first rotational direction and the second diffuser causes fluid flowing therethrough to swirl in a second rotational direction opposite the first rotational direction.

12. The exhaust aftertreatment system of claim 7, wherein each of the first, second and third diffusers includes a plurality of vanes inducing a swirled flow.

13. The exhaust aftertreatment system of claim 7, wherein the second chamber is at least partially defined by an annular insulation member.

14. The exhaust aftertreatment system of claim 7, wherein the inlet of the first housing includes a laterally outwardly extending tube, the tube including a longitudinal axis that is perpendicular to a longitudinal axis of the body of the first housing, and wherein the longitudinal axis of the tube does not intersect the longitudinal axis of the body.

15. The exhaust aftertreatment system of claim 14, wherein the second housing of the burner is concentric with the body of the first housing.

16. An exhaust aftertreatment system comprising:
a first housing including first and second chambers, the first chamber including an exhaust gas inlet receiving exhaust gas from an engine, the second chamber receiving exhaust gas from the first chamber and including an exhaust gas outlet;
a burner including a second housing and a combustion chamber disposed within the second housing, the second housing at least partially disposed within the first chamber, the burner supplying heated gas to the second chamber separately from the exhaust gas entering the second chamber from the first chamber, the heated gas within the burner being fluidly isolated from exhaust gas in the first chamber, the second housing being in a heat transfer relationship with exhaust gas in the first chamber;
a first swirl-inducing diffuser disposed between the first and second chambers and surrounding the second housing;
a second swirl-inducing diffuser attached to the first housing at the exhaust gas outlet of the second chamber; and
a third swirl-inducing diffuser disposed at an outlet of the second housing,
wherein each of the first, second and third swirl-inducing diffusers include a plurality of radially extending and spaced apart vanes.

17. The exhaust aftertreatment system of claim 16, wherein the burner supplies heated gas to the second chamber separately from the exhaust gas.

18. An exhaust aftertreatment system comprising:
a first tubular body having a first longitudinal axis and defining a chamber receiving exhaust gas from an engine and discharging the exhaust gas upstream of an aftertreatment device;
a second tubular body extending outward from the first tubular body and defining an inlet to the chamber, the second tubular body having a second longitudinal axis that is angled relative to the first longitudinal axis and is non-intersecting with the first longitudinal axis;
a burner including a housing and a combustion chamber disposed within the housing, the housing at least partially disposed within the chamber, the burner supplying heated gas to the first tubular body, the housing being in a heat transfer relationship with exhaust gas in the chamber, wherein the heated gas within the burner is fluidly isolated from the exhaust gas; and
a first diffuser disposed within the first tubular body and surrounding the housing of the burner;
wherein an outlet of the housing of the burner includes a second diffuser, and
wherein an outlet of the first tubular body includes a third diffuser.

19. The exhaust aftertreatment system of claim 18, wherein an angle between the first and second longitudinal axes is ninety degrees.

20. The exhaust aftertreatment system of claim 18, wherein the housing of the burner is concentric with the first tubular body.

21. The exhaust aftertreatment system of claim 18, wherein each of the first, second and third diffusers includes a plurality of vanes inducing a swirled flow.

22. The exhaust aftertreatment system of claim 21, wherein one of the first, second and third diffusers causes fluid flowing therethrough to swirl in a first rotational direction and another of the first, second and third diffusers causes fluid flowing therethrough to swirl in a second rotational direction that is opposite the first rotational direction.

\* \* \* \* \*

UNITED STATES PATENT AND TRADEMARK OFFICE
CERTIFICATE OF CORRECTION

| | | |
|---|---|---|
| PATENT NO. | : 8,959,902 B2 | Page 1 of 1 |
| APPLICATION NO. | : 13/778737 | |
| DATED | : February 24, 2015 | |
| INVENTOR(S) | : Keith G. Olivier et al. | |

It is certified that error appears in the above-identified patent and that said Letters Patent is hereby corrected as shown below:

In the Specification

Col. 10, line 6:   Delete "196" and insert --192--

Col. 12, line 25:  Delete "414." and insert --416.--

Col. 12, line 30:  Delete "414" and insert --416--

In the Claims

Col. 14, line 20:  In claim 1, delete "thesecond" and insert --the second--

Signed and Sealed this
Twenty-ninth Day of September, 2015

Michelle K. Lee
*Director of the United States Patent and Trademark Office*